Nov. 17, 1964     A. J. LAMPERT     3,157,026
COMPOSITE NOZZLE STRUCTURE
Filed Oct. 19, 1962     2 Sheets-Sheet 2
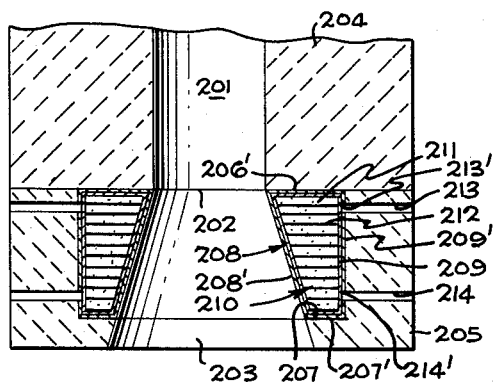
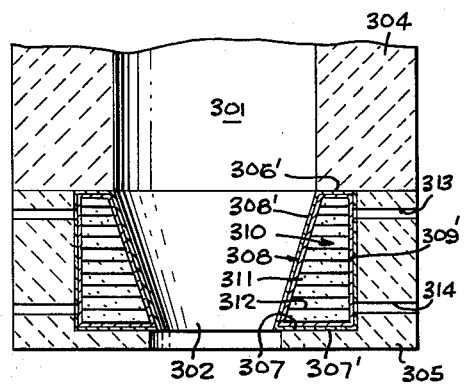
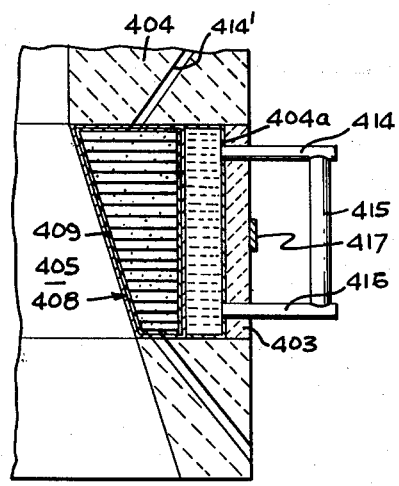
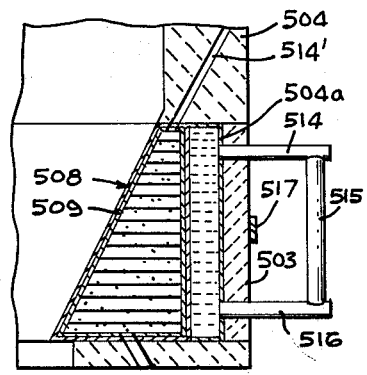
ALBERT J. LAMPERT
INVENTOR.
BY *Philip Subkow*
ATTORNEY United States Patent Office 3,157,026
Patented Nov. 17, 1964

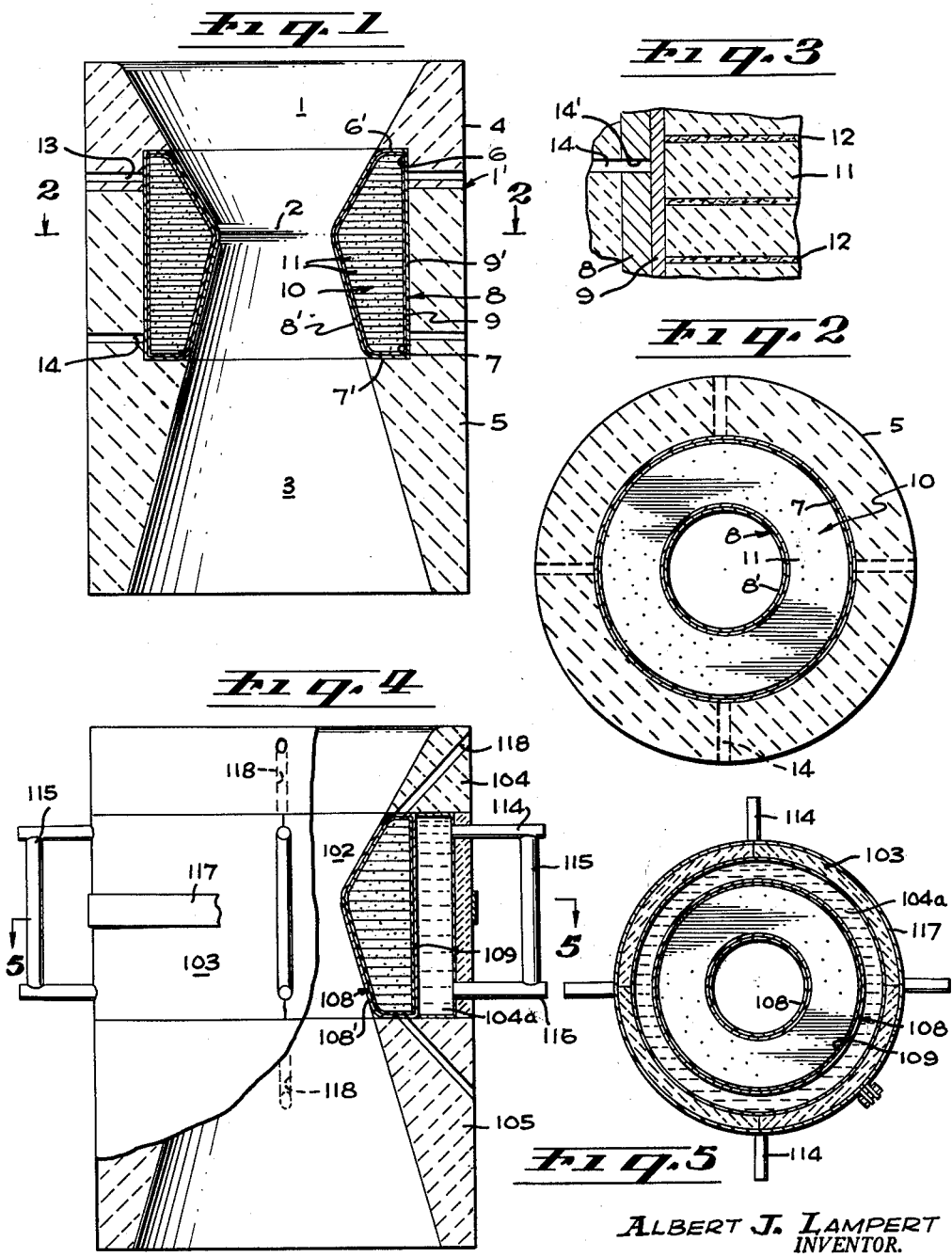

3,157,026
COMPOSITE NOZZLE STRUCTURE
Albert J. Lampert, Anaheim, Calif., assignor to Super-Temp Corporation, Santa Fe Springs, Calif., a corporation of California
Filed Oct. 19, 1962, Ser. No. 231,618
16 Claims. (Cl. 60—35.6)

This invention relates to the construction of conduits for high temperature gases. While of general utility where it is desired to contain, at high temperatures, gases under pressure higher than ambient, it has particular utility in nozzle constructions. It is particularly useful for use with nozzles for Jet Propulsion Systems, especially where the gases are at high temperatures in the range of 3,000° Fahrenheit or higher and are discharged at high velocities. In such systems, in which the thrust depends on the reaction resulting from the movement of high temperature gases through a nozzle, the shape of the nozzle is of critical importance. In all such nozzles, in order that the maximum thrust be developed at the exit of the nozzle, the nozzle parameters must be quite closely related to the rate of flow desired for the thrust which is to be developed.

The high velocity of the erosive gases generated at pressures substantially higher than ambient results in a mechanical and thermal action on the materials of which the nozzle is formed, which modifies the shape of the nozzle so its characteristics are deleteriously altered. This may markedly reduce the thrust attainable from the propulsion system.

It is one object of my invention to design a nozzle which will maintain its desired shape in use under the above conditions.

In order to maintain the shape of the nozzle, I employ a metallic lining for the interior of the throat section adjacent and at the divergent and convergent sections of the nozzle. I provide means to permit a high heat flux from the metallic lining to a heat sink, which will drain the heat away from the metallic lining at a rate sufficient to maintain the mechanical integrity of the nozzle structure.

To obtain this objective, the nozzle of my invention is formed as a composite structure. A composite structure may be defined as a structure composed of a number of different structural materials which, as a structural combination, has thermal and mechanical properties which the components of the structure by themselves do not possess. The structure of my invention is thermally anisotropic. It has a substantially higher heat flux rate in a radial direction than it has longitudinally through the structure.

There are very few metals which will withstand a temperature developed when using solid or liquid propellants which may develop flame temperatures in the order of 3,000° Fahrenheit or higher. Liquid propellant may develop exhaust gas velocities in the order of 7,000 to 10,000 feet per second. Even the refractory metals which have melting points suitable for use in the lower ranges of such combustion temperatures, and even those whose melting points approach the upper ranges of such temperatures, lose their mechanical properties when subjected to such conditions.

Depending on the temperature of the gas stream, the so-called refractory metals and their alloys which have suitable melting points and mechanical properties for use in the composite structure of my invention include the following: molybdenum, niobium (colombium), tantalum, tungsten, hafnium, rhenium, all of which, in their pure state, have melting points above about 4,000° Fahrenheit. These refractory metals will also have resistances to corrosion and erosion by the gases when used in the composite structure of my invention. Further, protection against oxidation by the gases may be provided by conventional refractory coatings such as have been used in the prior art for corrosion protection by high temperature gases. See the references collected in Industrial and Engineering Chemistry (I & EC, volume 54, No. 9, September 1962, pages 57 etc.).

The instability of the structure employing such metals alone, and not in the composite structure of my invention, makes a nozzle construction formed solely from such metals of inferior character not only because of its cost, but also because of its mechanical properties. Carbon nozzles may be employed where the temperature is not over about 6,000° Fahrenheit, since the sublimation temperature of carbon is in the neighborhood of 6,500° Fahrenheit. However, the brittle nature of the carbon is a disadvantage. It is relatively easily eroded by the gases, thus changing the shape of the nozzle; nor may such carbon be employed where the gases are of oxidizing nature. Structural carbon has the further disadvantage that it has relatively low structural strength.

In the composite structure of my invention, composed of the combination of the above metals and carbon, having a high heat conductivity in the required direction for the purposes described herein, I may reduce the mass of the metal required and thus reduce the cost. I am also able to improve the mechanical characteristics of the composite structure by providing for a heat drain from the surface of the metal so as to maintain its temperature at below the temperature of the gas stream itself and sufficiently low to retain sufficient mechanical strength to sustain the structural integrity of the nozzle. I am also able to employ the refractory nature of the metal to produce a metallic protective coating for the carbon and thus obtain the advantage of the properties of the metal with a reduction in cost of the structure, and obtain the benefits of the heat conductive properties of the carbon employed in the composite structure of my invention. I may, by this means, produce a composite structure having the structural and chemically resistant properties of a metallic surface of the refractory metal combined with a heat conductive property of the selected carbon. I thus employ the metal to protect the carbon and the carbon to conduct away the heat from the metal.

The metal is employed in the form of sheet material formed into the desired nozzle shape. The sheet is backed up by the mass of carbon conformed to the metal sheet to act as a support therefor and to provide the heat conduction away from the metal sheet, to maintain the temperature of the metallic sheet sufficiently low to preserve the structural integrity of the metal in its desired nozzle shape.

The preferred form of carbon of high heat conductivity in the preferred direction, which I employ as a backup structure, is the form known as pyrolytic graphite, fully described below. I orient the graphite so that its coefficient of heat conductivity is greatest in the radial direction of the nozzle. The nozzle body may be of any desired refractory material. I prefer to form it of structural carbon in those portions of the nozzle where the gas velocities are lower than where the metal shielding of the carbon is employed. I may thus take advantage of the coefficient of thermal expansion of the structural carbon, which is substantially lower than the coefficient of thermal expansion of the pyrolytic carbon graphite in a direction parallel to the nozzle axis. This minimizes the thermal stresses which are imposed on the structure by the thermal expansions of the component parts of the structure.

The above and other objects of my invention will be understood by reference to the drawings, of which:

FIG. 1 is a longitudinal section taken through the nozzle of my invention;

FIG. 2 is a section on line 2—2 of FIG. 1;

FIG. 3 is a fragmentary section of detail of FIG. 1;

FIG. 4 is a modification of the nozzle;

FIG. 5 is a fragmentary section detail of FIG. 4; and

FIGS. 6, 7, 8 and 9 are further modifications of my invention.

In FIG. 1 the nozzle outer body is formed of the convergent section 1, the throat section 2, and the divergent section 3. The nozzle body is in two sections with parting plane, such as 1'. Section 4 is formed of isotropic structural carbon or graphite and provided with a circumferential notch 6. Section 5 carries a complementary circumferential notch 7. Positioned in notches 6 and 7 is a metallic integral hollow nozzle assembly 8, formed of sheet metal, and consisting of a circular outer ring 9', an inner formed nozzle section 8', and top and bottom sections 6' and 7'. The interior surface 8' of the nozzle assembly is formed to conform to the geometry of the convergent section 1, throat 2 and divergent section 3. Interiorly of the nozzle assembly is a conforming metallic liner 9 which extends around all inner surfaces of the assembly. Inside the liner 9 is a heat transfer body 10 formed of a plurality of stacked annular wafers 11 formed of pyrolytic graphite, to be more fully described below, and separated by expansion joints 12 formed of a compressible material, to be more fully described below.

The bores 13 and 14 in the sections 4 and 5 register with complementary bores 13' and 14' in the outer ring 9' of the nozzle assembly. The liner 9 may be positioned only within the formed inner nozzle 8', or within other parts of the assembly as well. The nozzle structure described above may be assembled and mounted in a jet propulsion system in a conventional way.

The sheet material of the nozzle assembly is made of a metal which has a sufficiently high melting point to maintain its structural integrity at the temperatures existent in the nozzle. Preferably, the metal sheet at 8' should also be formable under the pressures of the gases at the high temperatures for purposes discussed below. Since, as described above, temperatures may range up from 3,000° Fahrenheit, depending upon the fuel employed, the metal should be chosen with the use of the nozzle in mind. Preferred metals are tungsten and its alloys, molybdenum and its alloys, or the other metals referred to above and to be discussed further below.

The inner liner 9 may be made of material whose boiling point is below the operating temperatures at the inner metal surfaces 8' of the box 8. Thus, for example, it should be preferably below about 5,000° F., depending upon the gas temperatures. What is desired is that the metal shall volatize prior to the attainment of the maximum temperature to which the liner 8' is heated. Depending on the temperatures attained, the following are some of the metals which may be employed: Aluminum, having a boiling point of about 2450° C.; tin, having a boiling point of about 2270° C.; copper, with a boiling point of about 2310° C.; lead, with a boiling point of about 1613° C.; zinc, with a boiling point of about 902° C. These boiling points are stated as they are reported in the literature. It is also desirable that the metal should have sufficiently high melting point so that it may act as a rigidifying liner to permit the pyrolytic graphite to expand radially, as will be described below, to provide a support for the metallic liner 8' before the liner 9 vaporizes.

When high temperature gases pass through the nozzle, the temperature of the nozzle body rises. The metallic liner 8' increases in temperature and the metallic liner 9 will be raised in temperature and vaporized, the vapors vented through the vent openings 13', 13, 14' and 14 to ambient pressure. The space left by the vaporizing liner provides room for the radial expansion of the pyrolytic graphite. The metallic liner 8', which is preferably formable at the maximum temperatures attained in the unit, is conformed to the interior surfaces of the annular wafers, which are made conical in shape at their interior surface to conform to the nozzle form.

The pyrolytic graphite referred to above is an anisotropic pyrolytic graphite. Such a material may be formed by the high temperature pyrolysis of hydrocarbons, for example, methane passed over a hot surface at approximately 4,000° F. The carbon atoms are deposited in laminar form on the hot surface to form materials whose properties are anisotropic. The heat conductivity of the material is much higher in the direction parallel to the plane on which the carbon was deposited, i.e., in the direction parallel to the plane of the laminate. The heat conductivity may be 100 times as great as the heat conductivity in the direction perpendicular to the plane of the laminate.

I take advantage of this property in employing the pyrolytic graphite to form the heat transfer body 11 of my invention. I shape the pyrolytic graphite in the form of annular wafers. The annular wafers are in the form of wafers whose outside cylindrical surface conforms to the back of 9' and whose internal surface is conical to conform to the conical nozzle surfaces at which the wafers are positioned. I preferably orient the planes of the laminate so that they shall be normal to the axis of the nozzle. Expansion joints, i.e., expansion takeup members 12 are placed between the wafers. They may be made of fibrous material, such as graphitic wool or metallic wool fibre, made of materials having sufficiently high melting point and whose modulus of elasticity is sufficiently high at the above temperatures to form a springy mass of fibers. For example, I may use wool fibres made of the same metal as that of which 8' is formed, or a pyrolytic graphite sponge material.

The pyrolytic graphite has a thermal coefficient of linear expansion in a direction perpendicular to the plane of the lamina which is much greater than in a direction parallel to said planes, for example, of the order of about 20 times as great. In order to avoid excessive stresses due to expansion or contraction, I provide the expansion members between the wafers and limit the thickness of the wafers so that excessive axial stresses in the nozzle structure do not result. The number of thicknesses of the expansion takeup members is correlated to the dimensions of the wafers and of the box so that, on expansion of the wafers, the longitudinal stress in the box, i.e., against the surfaces of 6 and 7, is not excessive, so as not to destroy the structure. The thickness of the liner 9 is correlated to the radial expansion of the wafer, so that the space provided on vaporization of the liner 9 will provide the room for the radial expansion of the graphitic wafer without distorting the shape of the interior of the box 8.

In the preliminary stages of the firing process, the temperature of the gases rises, and the nozzle structure heats up as heat is imparted to the liner 8'. The liner 9 conducts the heat away from the liner 8' to the pyrolytic graphite wafers and through the wafers radially to the structural carbon at 4 and 5, which then radiates its heat to the ambient environment, aided by the high emissivity of the carbon. It also acts as a heat sink. As temperature rises rapidly, and prior to reaching the boiling point of the liner 9, expansion of the carbon wafers, which is a maximum in the direction of the nozzle axis, is taken up by the expansion joints, and the axial stresses in the composite structure are minimized. The radial expansion of the wafers is taken up by the conformation of the liner 9 to the nozzle assembly. The residual air present between the walls of liner 8' and the liner 9, or between the liner 9 and the backup pyrolytic graphite carbon, if present at all, is vented through the openings 13, 13', 14 and 14'. When the temperature of the liner 9 has reached the boiling point of the metal, it vaporizes, and the metal vapor is vented to ambient through vent openings 13, 13', 14 and 14'. This provides further room for the radial expansion of the wafers.

If, as is preferred, the metal liner 8 at the interior surface of the nozzle is sufficiently formable at the operating temperature, the metal surfaces conform to the conical surfaces of the wafers, to maintain the structural integrity of the nozzle form.

In the above structure, the metallic liner 8' has a property of preserving the form of the wafers. In the absence of this protective liner, the graphic inner surface where it is impinged by the gas stream will spalt so that its inner surface will be eroded and thus the shape of the nozzle deleteriously altered. This is due to the laminate nature of the pyrolytic carbon and its structural weakness in the direction normal to the laminate. The metallic liner thus protects the surface of the graphitic carbon against the spalting action.

The above composite structure is suitable for conditions where the gas flow is of short duration and in which the heat masses of the structure and its heat conductivity is sufficient to prevent the melting out of the metallic liner 8'. Thus, although the gas temperatures may be in excess of the melting point of the metal of the liner 8', the heat transfer characteristics from the gas to the liner 8', from the liner 8' to the nozzle body, through the pyrolytic graphite, and from the nozzle body to the ambient atmosphere, may prevent the rise in temperature of the metal liner to its melting point before the combustion process that generates the gases has been completed. This temperature may be of the order of 4,000° to 5,000° F. at the metal surface of 8' and may permit the use of the metal specified above. If the temperature rises much above 5000° F., then the choice becomes more limited to those metals which have suitable melting points and other mechanical characteristics, for example, tantalum, tungsten and rhenium.

In order to reduce the temperature of the liner 8', and thus permit of the use of metal whose melting point would otherwise be too close to, or below, the temperature to which gases heat the metal liner, I may employ a composite structure employing an additional heat sink and, if desired, an additional heat dissipation composite structure.

Such a composite structure is illustrated in FIGS. 4 and 5. The nozzle body construction is composed of the convergent section 104 and a divergent section 105 and the outer center section 103, formed of a refractory metal such as is employed in the nozzle assembly of FIG. 1. The outer center section 103 is made in four quarter tubular sections, held together by a suitable means, as, for example, the strap 117 made of refractory metal. The central nozzle assembly 102 is formed of an enclosed nozzle 108–109, with an inner surface which conforms to the convergent throat and divergent section of the nozzle body, and an annular cylindrical jacket section 104a, formed of refractory metal such as is employed in the nozzle assembly of FIG. 1, described above, positioned on the exterior of the back of surface 109, to which are attached circulating tubes 114, 116 connected by tubes 115.

The nozzle assembly 102 is formed as described in FIG. 1 and carries the volatile liner 109 similar to the liner 9 of FIG. 1. The section 104 and 105 is bored with angular bores 118 that go through the bottom and top of the sections 108 and the liner 109. The annular cylinder 104a and tubes 114, 115 and 116 are filled with molten metal whose properties are described below. Quarter sections of carbon carrying semi-cylindrical notches are fitted around the cylinder 104a and the tubes 114 and 116 and are held in place by a suitable strap 117, or 103 may be formed from a solid carbon ring formed about the center section.

The metal in 104a is selected to have a boiling point above the boiling point of liner 109, and a melting point below the temperature of the surface of 108'.

I prefer to employ as this heat mass a metal which has a sufficiently low melting point to become fused under the conditions of operation, and preferably with a sufficiently high boiling point so as not to generate any excessive vapor pressure in the confining space in which the molten metal of my composite structure is positioned. Thus, the following table illustrates some possible combinations which may be used, depending on the operating conditions.

| Metal in 109 | Metal in 104a |
|---|---|
| Al | Co, Ni, Li |
| Cr | Al, Co |
| Cu | Al, Ni, Co, Sn |
| Pb | Al, Cr, Co, Cu, Sn |
| Sn | Cu, Ni, Al, Co, Cr |
| Zn | Al, Cr, Co, Cu, Sn |

In the above table, the metals in 104a have boiling points above the boiling point of the metal of 109 and melting points below the melting point of the metal in 108' which is chosen for such purpose.

In operating the system in FIGS. 4 and 5, the gases heat the metallic box containing the metal liner and the pyrolytic graphite similarly to that described in FIG. 1. Prior to the vaporization of the metal liner 109, the metal 104a has been melted. The temperature of the molten mass in a nozzle axial direction is higher towards the convergent end than is the temperature of the molten mass at the divergent end or the throat section of the box 108.

There is, therefore, a thermosiphonic circulation of the molten metal in box 104a through 115, which cools the material in box 104a. The conditions of cooling are such that the material is not cooled below its melting point. This is accomplished by proportioning the cooling surfaces of the tubular conduits 115 to insure that there is no freezing of the metal. This may be avoided since there is a large heat flux from the nozzle into the annulus 104a. The circulation of the material through the tubes 115 maintains the material in liquid condition and below its boiling point and above its melting point. If super cooling occurs and the mass in 104a is maintained in solid condition, it still will act as a heat sink for the purposes described above. This heat sink, therefore, moderates the temperature at 108' and maintains it at sufficiently low temperature to avoid any excessive impairment of its mechanical integrity.

In FIG. 6 the nozzle body is formed of the cylindrical section 201 of the throat section 202 and the divergent section 203. The nozzle body is in two sections. Section 204 is formed of isotropic structural carbon or graphite. Section 205 carries a circumferential notch 207. Positioned between section 204 and notch 207 is a metallic integral nozzle assembly 208, formed of sheet metal and consisting of a circular outer ring 209' and an inner formed nozzle section 208' and top section 206' and bottom section 207'. The height of the assembly is sufficient to position the box in the divergent sections of the nozzle and in throat 202. The interior surface 208' of the nozzle assembly is formed to conform to the geometry of the divergent section 203 and throat 202. Interiorly of the assembly 208 is a conforming metallic liner 209 which extends around all inner surfaces of the assembly. Inside the liner 209 is a heat transfer body 210, similarly constructed as in the forms shown in FIGS. 1–3. Wafers 211 are separated by expansion joints 212, formed of a compressible material, as described in connection with FIGS. 1–3.

The bores 213 and 214 in the section 205 register with complementary bores 213' and 214' in the back 209' of the assembly. The liner 209 may be positioned only at the conical metallic section 208' of the assembly or at other parts of the assembly as well. The nozzle structure described above may be assembled and mounted in a jet propulsion system in a conventional way.

FIG. 7 shows the same construction but applied to a convergent nozzle. Similar parts are similarly numbered but are given a number 100 higher than the same parts in FIG. 6.

FIGS. 8 and 9 show the application of the form of my invention as shown in FIGS. 4 and 5 to convergent and divergent nozzle forms. The nozzle body construction is composed of the cylindrical section 404 and a divergent section 405 and the outer section 403. The outer section is made in four quarter tubular sections, held together by a suitable means, as, for example, the strap made of refractory metal. The central nozzle assembly is formed of the nozzle assembly 408, whose interior surface 408' is conical to conform to the divergent section of the nozzle. The assembly carries an annular cylindrical section 404a on the exterior of the back surface assembly 408, to which are attached circulating tubes 414, 416 connected by tubes 415.

The nozzle assembly, formed of metal as described in FIGS. 1 and 6, carries the volatile liner 409 similar to liner 9 of FIG. 1 and 209 of FIG. 6. The section 404 is bored with bores 414' that go through the bottom and top of the assembly 408 and the liner 409. The annular cylinder 404a and tubes 414, 415 and 416 are filled with molten metal, as is described in connection with the forms of FIGS. 4 and 5. Quarter sections of carbon carrying semi-cylindrical notches are fitted around the cylinder 404a and the tubes 414 and 416 and are held in place by a suitable strap 417, as is described for the forms of FIGS. 4 and 5.

The form illustrated in FIG. 9 applies the structure of FIG. 8 to the convergent form of nozzle. Except for the direction of the slope of the cone of the nozzle, the construction is the same as in the case of FIG. 8, all similar parts being numbered by a number 100 higher than the similar parts on FIG. 8.

While I have described particular embodiments of my invention for the purpose of illustration, it should be understood that various modifications and adaptations thereof may be made within the spirit of the invention, as set forth in the appended claims.

I claim:

1. A composite nozzle construction comprising a nozzle body having an inlet and outlet and a throat section, a hollow metallic nozzle assembly positioned between said inlet and outlet and adjacent said throat portion having an interior conical wall, an outer circular ring wall, and a top wall and bottom wall connecting said conical wall and said ring wall, a plurality of wafers of pyrolytic graphite lamina positioned in said nozzle assembly, the laminar planes of said wafers being transverse to the axis of said nozzle, and layers of compressible material positioned between said wafers.

2. In the construction of claim 1, in which the metal of said conical wall has a melting point above about 4000° F.

3. In the structure of claim 1, an external jacket surrounding said ring wall, a metallic mass positioned in said jacket, said metallic mass having a substantially lower melting point than the metal of said conical wall.

4. In the structure of claim 3, in which the metal of said conical wall has a melting point above about 4000° F.

5. In the structure of claim 3, circulating tubes connected to said jacket and extending exteriorly of said nozzle body.

6. In the structure of claim 5, in which the metal of said conical wall has a melting point above about 4000° F.

7. In the composite structure of claim 1, metallic sheet material between said wafers and said conical wall, the metal of said metallic sheet material having a boiling point lower than the boiling point of the metal of said conical wall, and a vent passageway through a wall of said nozzle asssembly and said nozzle body to the exterior of said nozzle body.

8. In the structure of claim 7, in which the metal of said conical wall has a melting point above about 4000° F.

9. In the structure of claim 7, an external jacket surrounding said ring wall, a metallic mass positioned in said jacket, said metallic mass having a substantially lower melting point than the metal of said conical wall.

10. In the structure of claim 9, in which the metal in said conical wall has a melting point above about 4000° F.

11. In the structure of claim 9, circulating tubes connected to said jacket and extending exteriorly of said nozzle body.

12. In the structure of claim 11, in which the metal of said conical wall has a melting point above about 4000° F.

13. In the structure of claim 7, said metallic mass having a boiling point higher than the metal of said metallic sheet material positioned between the wall of said nozzle assembly and said wafers.

14. In the structure of claim 13, in which the metal of said conical wall has a melting point above about 4000° F.

15. In the structure of claim 13, circulating tubes connected to said jacket and extending exteriorly of said nozzle body.

16. In the structure of claim 13, in which the metal of said conical wall has a melting point above about 4000° F.

References Cited in the file of this patent

UNITED STATES PATENTS

| | | |
|---|---|---|
| 2,574,190 | New | Nov. 6, 1951 |
| 3,048,972 | Barlow | Aug. 14, 1962 |
| 3,070,957 | McCorkle | Jan. 1, 1963 |

OTHER REFERENCES

Aviation Week, Feb. 13, 1961, pages 67, 69, 71 and 72 relied on.